United States Patent
Niidome

(10) Patent No.: US 6,524,459 B1
(45) Date of Patent: Feb. 25, 2003

(54) ELECTRODE FOR ELECTRON-EMITTING DEVICE

(75) Inventor: Katsuyuki Niidome, Kumamoto (JP)

(73) Assignee: Jem Co., Ltd., Kumamoto (JP)

( * ) Notice: Subject to any disclaimer, the term of this patent is extended or adjusted under 35 U.S.C. 154(b) by 0 days.

(21) Appl. No.: 09/719,723

(22) PCT Filed: Nov. 15, 1999

(86) PCT No.: PCT/JP99/06375

§ 371 (c)(1),
(2), (4) Date: Dec. 14, 2000

(87) PCT Pub. No.: WO00/30983

PCT Pub. Date: Jun. 2, 2000

(30) Foreign Application Priority Data

Nov. 19, 1998 (JP) .......................................... 10-375216

(51) Int. Cl.⁷ ................................................. C02F 1/48
(52) U.S. Cl. ............................ 204/667; 96/95; 204/291; 204/660; 204/664; 204/671; 210/243; 313/356
(58) Field of Search .................... 204/660, 664, 204/667, 671, 291; 96/80, 82, 95, 97; 210/243, 748; 313/354, 356

(56) References Cited

U.S. PATENT DOCUMENTS

| | | | |
|---|---|---|---|
| 4,483,756 A | * 11/1984 | Lowther | ..................... 204/155 |
| 4,886,593 A | 12/1989 | Gibbs | |
| 5,591,317 A | * 1/1997 | Pitts, Jr. | ..................... 204/667 |
| 5,601,909 A | * 2/1997 | Kubo | ......................... 442/417 |
| 5,681,457 A | * 10/1997 | Mahoney | ................. 210/198.1 |
| 5,776,346 A | * 7/1998 | Fukai | ......................... 210/663 |

FOREIGN PATENT DOCUMENTS

| | | |
|---|---|---|
| JP | 56-143809 | 10/1981 |
| JP | 60-246771 | 12/1985 |
| JP | 3-275191 | 12/1991 |
| JP | 05-137804 | 6/1993 |
| JP | 07-068269 | 3/1995 |
| JP | 07-204656 | 8/1995 |
| JP | 09-094581 | 4/1997 |
| JP | 11-244864 | 9/1999 |
| WO | WO 85/01041 | 3/1985 |

OTHER PUBLICATIONS

Arthur Rose Et Al. The Condensed Chemical Dictionary, Seventh Edition, Reinhold Publishing Corp., New York, 1966, pp 956–957.*

* cited by examiner

Primary Examiner—Nam Nguyen
Assistant Examiner—William T. Leader
(74) Attorney, Agent, or Firm—Jordan and Hamburg LLP

(57) ABSTRACT

An electron-emitting device has a primary and a secondary coil wound on an I-core, an E-core combined with the I-core and a single output terminal extended from one end of the secondary coil. An electron-emitting electrode includes a stainless steel pipe, an insulator-coated conductor inserted in a pipe, and tourmaline powder filling the gap between the pipe and the conductor. The stainless steel pipe is enclosed in a polyethylene pipe, and the openings of the stainless steel pipe and polyethylene pipe are sealed by silicon resin. The electron-emitting electrode is connected to the output terminal of the electron-emitting device and is submerged in an object to be processed, which is in turn charged negatively and activated by high electrostatic potential.

8 Claims, 10 Drawing Sheets

ELECTRODE FOR ELECTRON-EMITTING DEVICE

TECHNICAL FIELD

The present invention relates to an electron-emitting device used for manufacturing electron-charged water, counteracting and removing chemical substances, or increasing an anion concentration in air, as well as an electrode used in the electron-emitting device.

BACKGROUND ART

An electron-emitting device has been utilized for manufacturing electron-charged water which is used as drinking water, processed water, cooking water, bath water or the like for businesses such as processed food manufacturers, supermarkets and hotels and for households. The device has also been used for the purposes of counteracting and removing chemical substances contained in food, materials for processed food, livestock feed or the like as well as adding anions to air.

Some examples of the above-described electron-emitting devices have been disclosed in Unexamined Japanese Patent Publication Nos. H5-137804, H7-204656 and H9-94581. An electron-emitting electrode connected with an output terminal of the electron-emitting device is submerged in water in a water tank or a bathtub and is charged with high electric potential, thereby generating electron-charged water.

In a method of manufacturing electron-charged water disclosed in Unexamined Japanese Publication No. H5-137804, a potential treatment device which takes out negative electrons having a specific waveform from an AC100V commercial power supply is used as an electron-emitting device for producing electron-charged water. The electron-emitting device, however, cannot generate current of more than 0.1 mA, and the charged potential is extremely low.

Therefore, there is substantially no effect of potential, which makes it difficult to efficiently manufacture electron-charged water.

An electron-emitting device used in a device for manufacturing electron-charged water disclosed in Unexamined Japanese Publication No. H7-204656 is a potential treatment device or an inverter. The electron-emitting device can generate an alternating or a pulsating current at a frequency of 5,000 to 500,000 Hz and a voltage of 1 to 100V. However, since the frequency range is too wide, it is difficult to select and fix an optimum frequency for efficiently manufacturing electron-charged water. Thus, if the selected frequency is wrong, it may take a long time to manufacture electron-charged water.

In a method of manufacturing electron-charged water disclosed in Unexamined Japanese Patent Publication No. H9-94581, a device which generates high-voltage AC static potential at a frequency of 50/60 Hz and a voltage of 500 to 60,000V is employed as an electron-emitting device. The device, however, needs to have a large-scaled insulation structure in order to prevent electric leakage and for safety because the device generates a high voltage of 500 to 60,000V.

A conventional electron-emitting electrode which is used in combination with an electron-emitting device for manufacturing electron-charged water has such a structure that a metal alligator clip is provided on an end of a copper wire connected to an electron-emitting device. A tank, a table, a bathtub, or the like, where an object to be processed such as drinking water, food and bath water are placed, are electrically insulated from earth using an insulating material such as an insulator, and a metal member clamped by an alligator clip is submerged in water or the object to be processed is clamped by an alligator clip, thereby charging the electrode with a potential.

When adding anions to air in a room, a metal electrode electrically insulated with an insulating material such as an insulator, is hung from a ceiling or on a wall and clamped by an alligator clip provided on an end of a copper wire which is connected to an electron-emitting device.

According to the above methods, however, an object has to be kept insulated from earth, a ceiling or the like. Therefore, the system is complicated and large-scaled and requires remodeling to secure a space for installation. Thus, such methods cannot be easily implemented and remain inconvenient.

To solve the above problems, the other techniques for manufacturing electron-charged water are disclosed in Unexamined Japanese Patent Publications Nos. H5-137804, H7-204656 and H9-94581.

In a method for manufacturing electron-charged water disclosed in Unexamined Japanese Patent Publication No. H5-137804, it is not necessary to keep a bathtub itself insulated. However, water in a bathtub needs to be kept insulated using a pad, sheet or the like made of nonconductive material, which causes problems in practice. Furthermore, since it is substantially impossible to completely insulate water in a bathtub, electrical leakage may occur.

A method of manufacturing electron-charged water disclosed in Unexamined Japanese Patent Publication No. H7-204656 does not need any insulators. In this case, however, water in a non-insulated vessel is directly charged with potential, presenting the possibility of electrical leakage.

According to a method of manufacturing electron-charged water disclosed in Unexamined Japanese Patent Publication No. H9-94581, a water vessel need not be kept insulated by use of a stainless steel electron radiation electrode coated with electric insulating resin. Nevertheless, compared with a non-coated stainless steel electron radiation electrode, the stainless steel electron radiation electrode, because it is covered with insulating resin, has low electron radiating function, which tends to require a longer time to manufacture electrically-processed water.

In view of the above, an object of the present invention is to provide an electron-emitting device having high safety and endurance which can negatively charge and activate an object to be processed efficiently, and an electrode for an electron-emitting device which is safe and can negatively charge and activate an object to be processed efficiently without requiring insulation of an object to be processed, a vessel or the like.

SUMMARY

The electron-emitting device of the present invention is a device comprising a primary coil and a secondary coil wound on an I-core, an E-core combined with the I-core, and a single output terminal extended from one end of the secondary coil. By this structure, high potential is generated by adding an electric field of the secondary coil around a magnetic field of the I-core, and high electrostatic potential is obtained by employing only one output terminal as a single output terminal from two output terminals of the secondary coil. Thus, an object to be processed can be negatively charged and activated efficiently while enhancing safety.

In the above electron-emitting device, the secondary coil is divided into two sections and wound on plural parts on the I-core so that potential of the secondary coil is efficiently increased, thereby providing higher electrostatic potential.

A leakage path iron core which is coated with insulating material is provided between the primary coil and the secondary coil. In the case that the device is damaged, the leakage path iron core functions as electrical resistance so as to check an increase of current flowing to the secondary coil, which further enhances safety.

The E-core is provided so as to surround the I-core, the primary core and the secondary core. By this structure, the magnetic field becomes stable, thereby limiting fluctuation of the potential. Further, if an insulating gap is formed between the secondary coil and the E-core, troubles such as damage in an internal insulation can be prevented.

In the electron-emitting device, alternating current generated in an output terminal is adjustable within a range from 3,000V to 15,000V. Thus, an optimum current can be fixed depending on a capacity, form and characteristic of a load or an object to be processed, and the object can be charged with the most efficient electrostatic potential.

An electrode for an electron-emitting device of the present invention comprises a plurality of bottom-closed cylindrical members in which at least one of the bottom-closed cylindrical members is made of insulating material, the bottom-closed cylindrical members being combined to be nested, an insulator-coated conductor of which an end is inserted into an innermost member of the bottom-closed cylindrical members, tourmaline powder filling a gap between the innermost bottom-closed cylindrical member and the insulator-coated conductor and/or a gap between the plurality of the bottom-closed cylindrical members, and an insulating seal member which seals openings of the plurality of the bottom-closed cylindrical members. The term "nested" used here describes an aggregation of a plurality of bottom-closed cylindrical members having different outer diameters wherein a member having a smaller outer diameter is inserted into a member having a larger outer diameter consecutively.

By employing the above structure, the electrode itself, which comprises a plurality of bottom-closed cylindrical members and tourmaline powder, functions as a capacitor. In the electron-emitting device, when an insulator-coated conductor is charged with high electrostatic potential, a large amount of electrons are radiated into the bottom-closed cylindrical members from the tourmaline powder. These electrons are then supplied to an object to be processed as a wave or undulation so that the object is negatively charged and activated efficiently. The reason for this phenomenon has not yet been clarified; however, it is assumed that tourmaline, when charged with high electrostatic potential, generates a large amount of electrons because tourmaline, unlike other minerals, has such property that the positive pole and the negative pole are formed on both sides of the crystal, respectively, and is also chargeable.

In the insulator-coated conductor which is to be charged with high electrostatic potential, the outer periphery and the end thereof are wholly coated with insulating material, and the insulator-coated conductor is also completely covered with at least one bottom-closed cylindrical member made of insulating material and an insulating seal member. Therefore, an object to be processed does not require insulation. Further, if excessive current is generated due to damage in an electron-emitting device or the like, no electrical leakage is caused, which leads to greater safety.

In the above electrode for an electron-emitting device, at least one of the plurality of bottom-closed cylindrical members is a conductive cylindrical member. Thus, the insulator-coated conductor is insulated from earth potential, and invasion of anions having an opposite molecular structure is interrupted, thereby enhancing electron-emitting function. Therefore, an object to be processed is negatively charged and activated more efficiently. Furthermore, the enhanced electron-emitting function also improves the function of preventing internal damages in an electron-emitting device, which leads to higher safety.

As the tourmaline powder, fluid powder having a diameter of 1 $\mu$m to 5 mm is used, which makes it easier to fill the bottom-closed cylindrical members having different inner diameters which are combined to be nested. Thus, an excellent electron-emitting effect can be exhibited. It is expected from experience that the smaller the diameter of the powder is, the clearer the positive and negative poles formed on the both sides of the crystal are, which will enhance electron-emitting function.

As a conductive cylindrical member, a stainless steel pipe is used, and as an insulating cylindrical body, a pipe made of either of polyethylene, glass, pottery or ceramic is used. As an insulating seal member, silicone resin is used.

DETAILED DESCRIPTION

Referring to the attached drawings, an electron-emitting device of the present invention is explained in further detail below.

Figure 1:
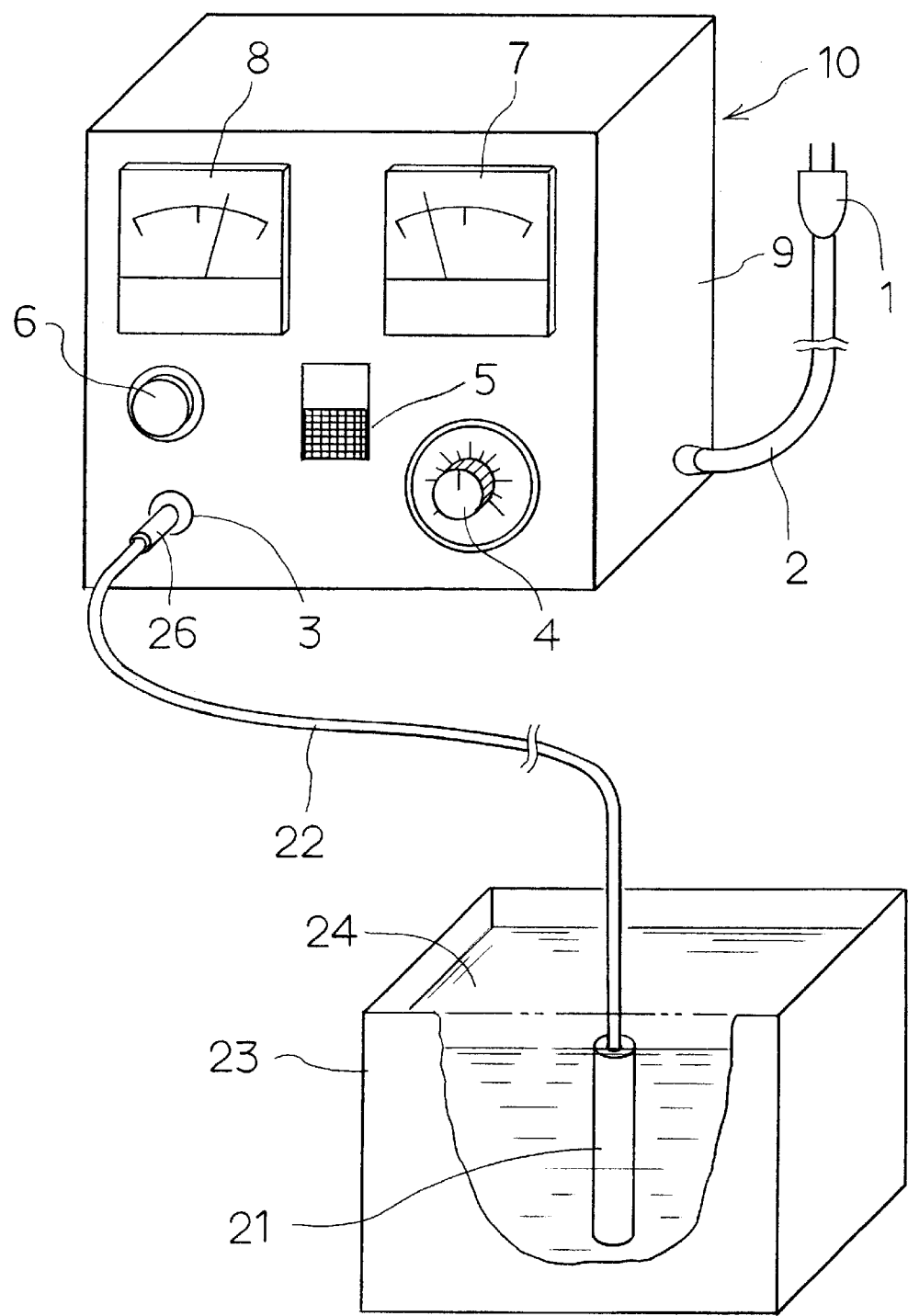
FIG. 1 is a perspective view showing a preferred embodiment of an electron-emitting device according to the present invention.

FIG. 1 shows an electron-emitting device 10 of a preferred embodiment of the present invention. In the electron-emitting device 10, provided are a main switch 5, a pilot lamp 6, a voltage adjusting dial 4, a single output terminal 3, an ammeter 7 and a voltmeter 8 on a front panel of a box-type casing 9 made of metal. On a side panel of the box-type casing 9, a power supply cord 2 is provided.

Figure 2:
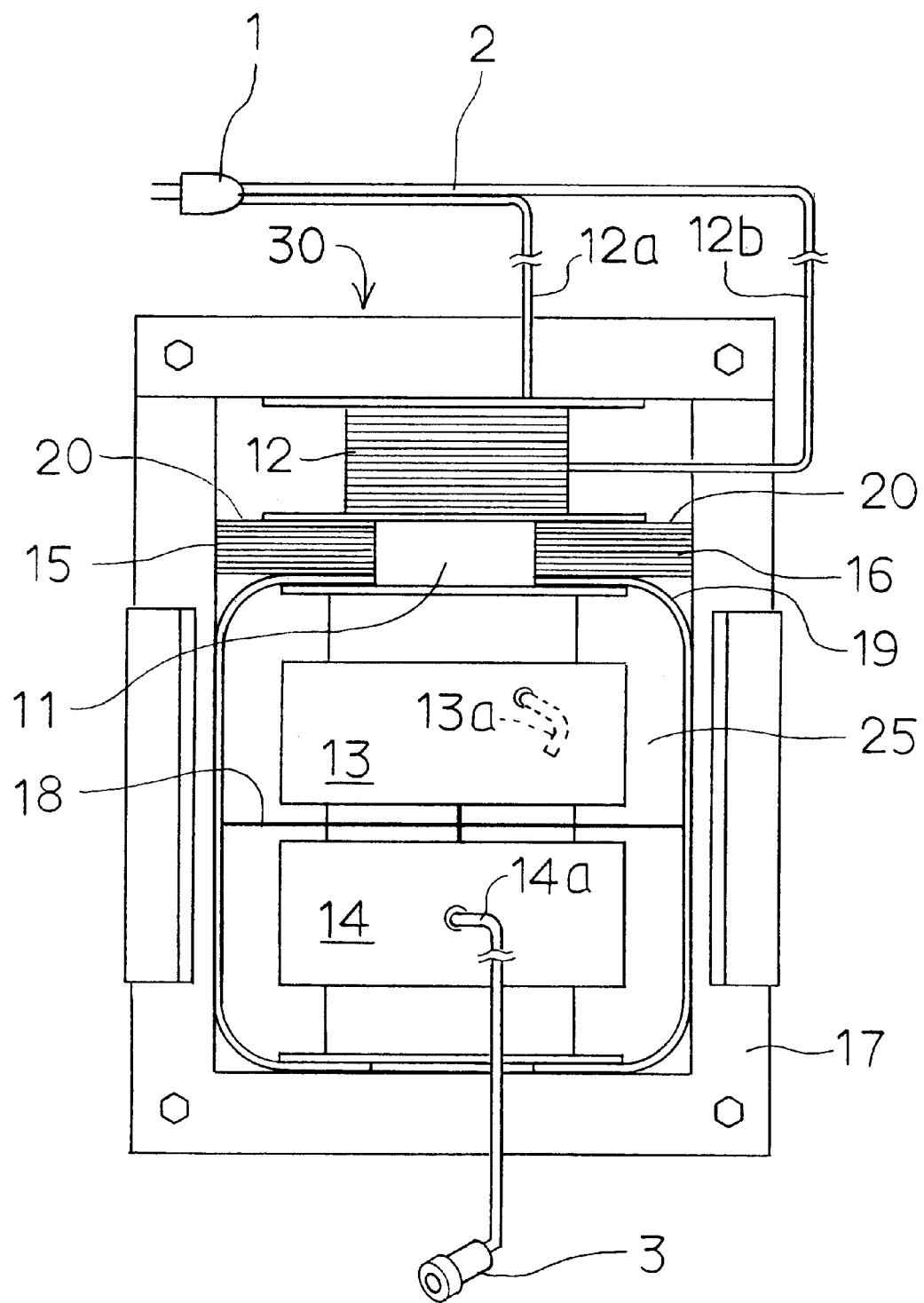
FIG. 2 is a plan view of an electron-emitting converter which constitutes the electron-emitting device shown in FIG. 1.
Figure 3:
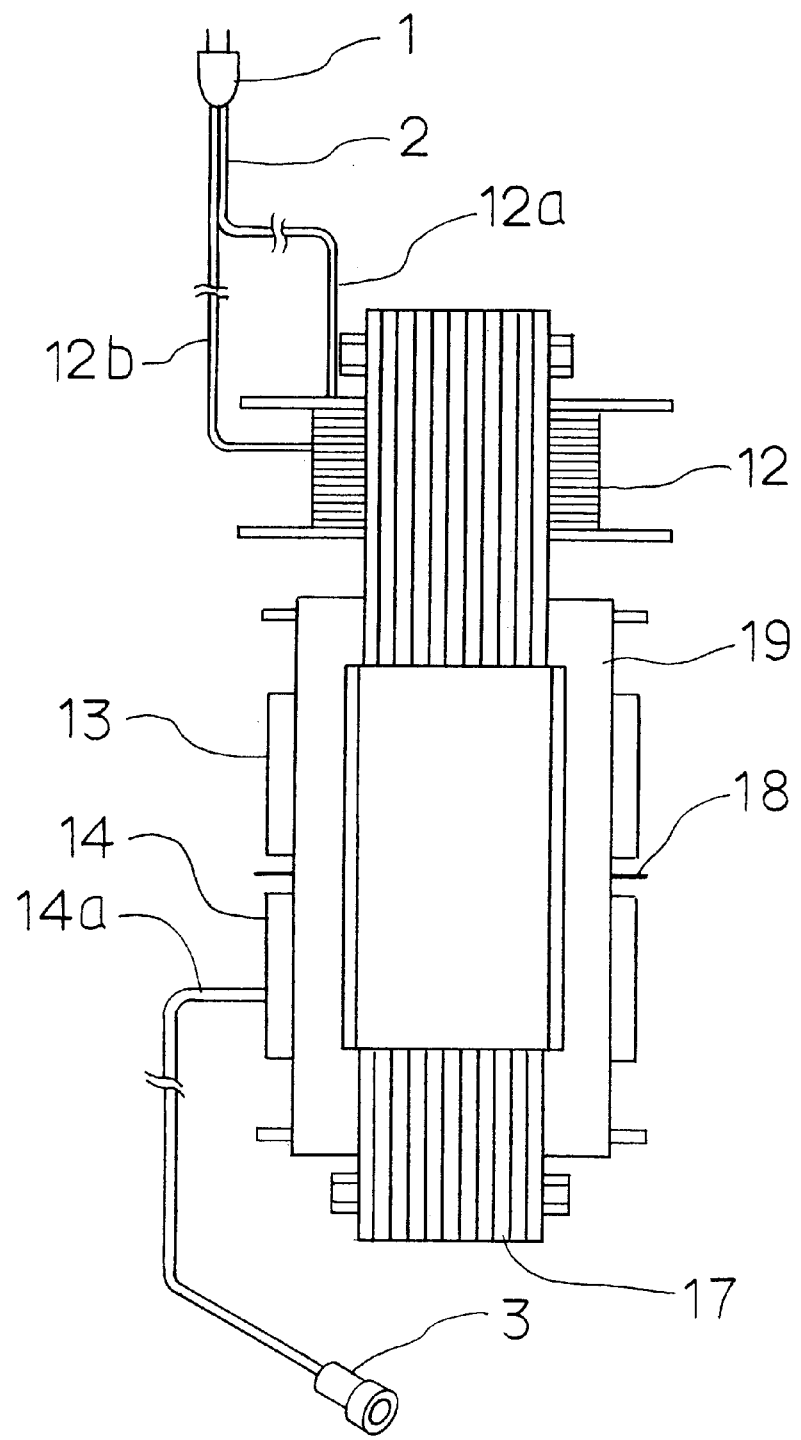
FIG. 3 is a side view of the electron-emitting converter shown in FIG. 2.

FIGS. 2 and 3 show an electron-emitting converter 30 which is enclosed in the electron emitting device 10. In the electron-emitting converter 30, a primary coil 12 and secondary coil sections 13 and 14 are wound on an I-core 11. Leakage path iron cores 15 and 16 which are covered with an insulating paper 20 are disposed between the primary coil 12 and the secondary coil sections 13 and 14. Surrounding the above, an E-core 17 is provided.

The secondary coil sections 13 and 14, which are separately disposed in two parts, are electrically connected to each other but sectioned by an insulating paper 18. The secondary coil sections 13 and 14 are isolated from the E-core 17 by an insulating sheet 19 made of polyester. A gap 25 is formed between the secondary coil sections 13 and 14 and the insulating sheet 19.

Terminals 12a and 12b of the primary coil 12 are connected to the power supply cord 2. A terminal 13a of the secondary coil section 13 is disconnected, and only a terminal 14a of the secondary coil section 14 is connected to the output terminal 3. When alternating current is inputted into the primary coil 12, high electrostatic potential which has a particular waveform of current is generated in the terminal 14a of the secondary coil section 14.

A plug 1 of the power supply cord 2 is inserted into a wall socket of AC 100V, and a pin jack 26 provided on a base end portion of an insulator-coated conductor 22 extended from an electron-emitting electrode 21 is connected to the output terminal 3. Then, turning on the main switch 5, the pilot lamp is turned on, and the electron-emitting electrode 21 is charged with predetermined electrostatic potential. Thus, by submerging the electron-emitting electrode 21 in water 24 in a water tank 23, the water 24 is negatively charged and activated to generate electron-charged water.

The electrostatic potential with which the electron-emitting electrode 21 is charged can be varied within a range from 3,000V to 15,000V by turning the voltage adjusting dial 4, thereby fix the suitable conditions depending on a property and amount of the water 24.

In the electron-emitting electrode 21, as described in the following section, since an outer periphery and end of a conductor (not shown) are wholly coated with an insulator, there is no danger of leakage of electrostatic potential with which the electron-emitting electrode 21 is charged. Thus, electron-charged water can be safely generated without keeping the water tank 23 and the water 24 insulated.

In the prior arts, potential with which a load is charged varies depending on a capacity and type of the load and on an insulating quality. According to the present invention, however, a combination of the electron-emitting device 10 and the electron-emitting electrode 21 can maintain safety with a high standard. Furthermore, by increasing potential with which a load is charged, the potential inside the electron-emitting device 10 can be kept low, thereby enhancing safety.

As mentioned in the former section, the secondary coil sections 13 and 14 are isolated from the E-core 17 by the insulating sheet 19 made of polyester, and the gap 25 is formed between the secondary coil sections 13 and 14 and the insulating sheet 19. Thus, damage such as internal insulation destruction can be prevented.

Figure 4A:
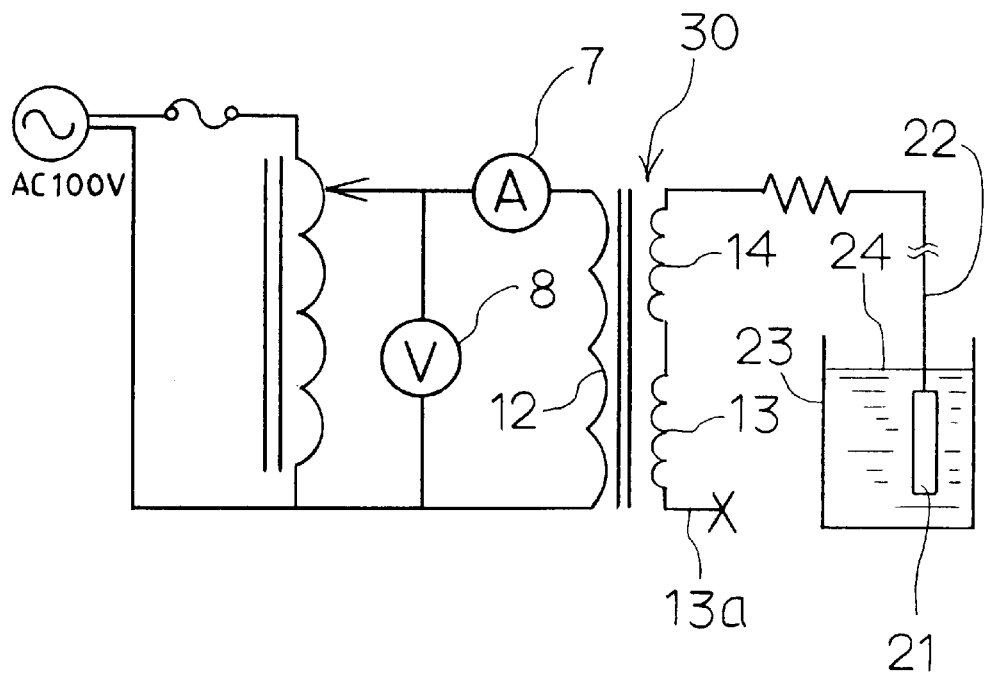
FIG. 4 is a schematic view illustrating a circuit of the electron-emitting device show in FIG. 1.
Figure 4B:
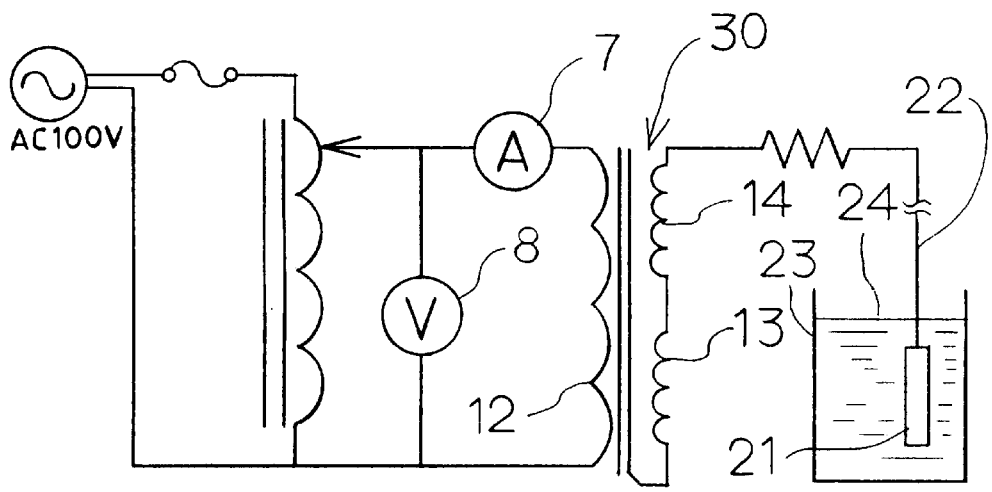

FIG. 4 is a schematic view illustrating a circuit of the electron-emitting device show in FIG. 1. When electron-charged water is being manufactured with the electron-emitting device 10, the electron-emitting electrode 21 is charged with electrostatic potential forming an electrical circuit shown in FIG. 4(a). If, as shown in FIG. 4(b), the electron-emitting electrode 21 were charged with AC 100V due to damage in the secondary coil unit 13 or the like, the electricity would not leak from the electron-emitting device 21 to the water 24, which eliminates the risk of electric shock.

The present invention is not limited to the above-described electron-emitting device 10. Winding number and proportions of the primary coil and secondary coil which constitute the electron-emitting converter may optionally be modified to select the best electrostatic potential depending on a type, property, capacity or the like of an object to be processed.

Referring to the attached drawings, an electron-emitting electrode of the present invention is explained in further detail below.

Figure 5:
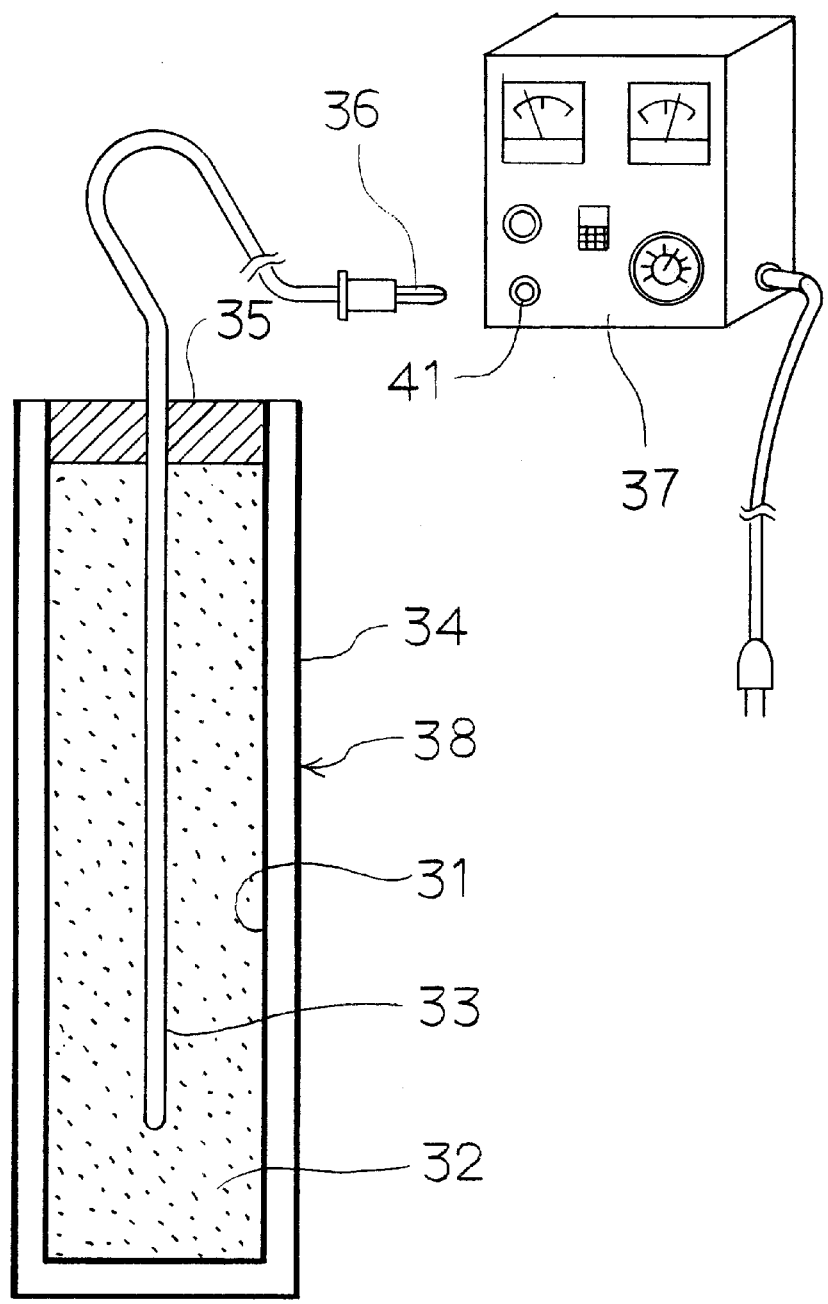
FIG. 5 is a longitudinal sectional view showing a preferred embodiment of an electrode for an electron-emitting device according to the present invention.

FIG. 5 shows a longitudinal sectional view of an electron-emitting electrode 38 as a preferred embodiment of the present invention. In the electron-emitting electrode 38, an insulator-coated conductor 33 is inserted into a stainless steel pipe 31 which is a bottom-covered conductive cylindrical member. Tourmaline powder 32 fills a gap between the stainless steel pipe 31 and the insulator-coated conductor 33, and the outside of the stainless steel pipe 31 is covered with a polyethylene pipe 34 which is a bottom-covered insulating member. Openings of the stainless steel pipe 31 and the polyethylene pipe 34 are sealed with a silicone resin 35 which is an insulating seal material.

In the insulator-coated conductor 33 inside the stainless steel pipe 31, an end and outer periphery of the conductor are wholly covered with an insulating material. On a base end portion of the insulator-coated conductor 33, provided is a pin jack 36 for connecting to an output terminal 41 of an electron-emitting device 37.

Figure 6:
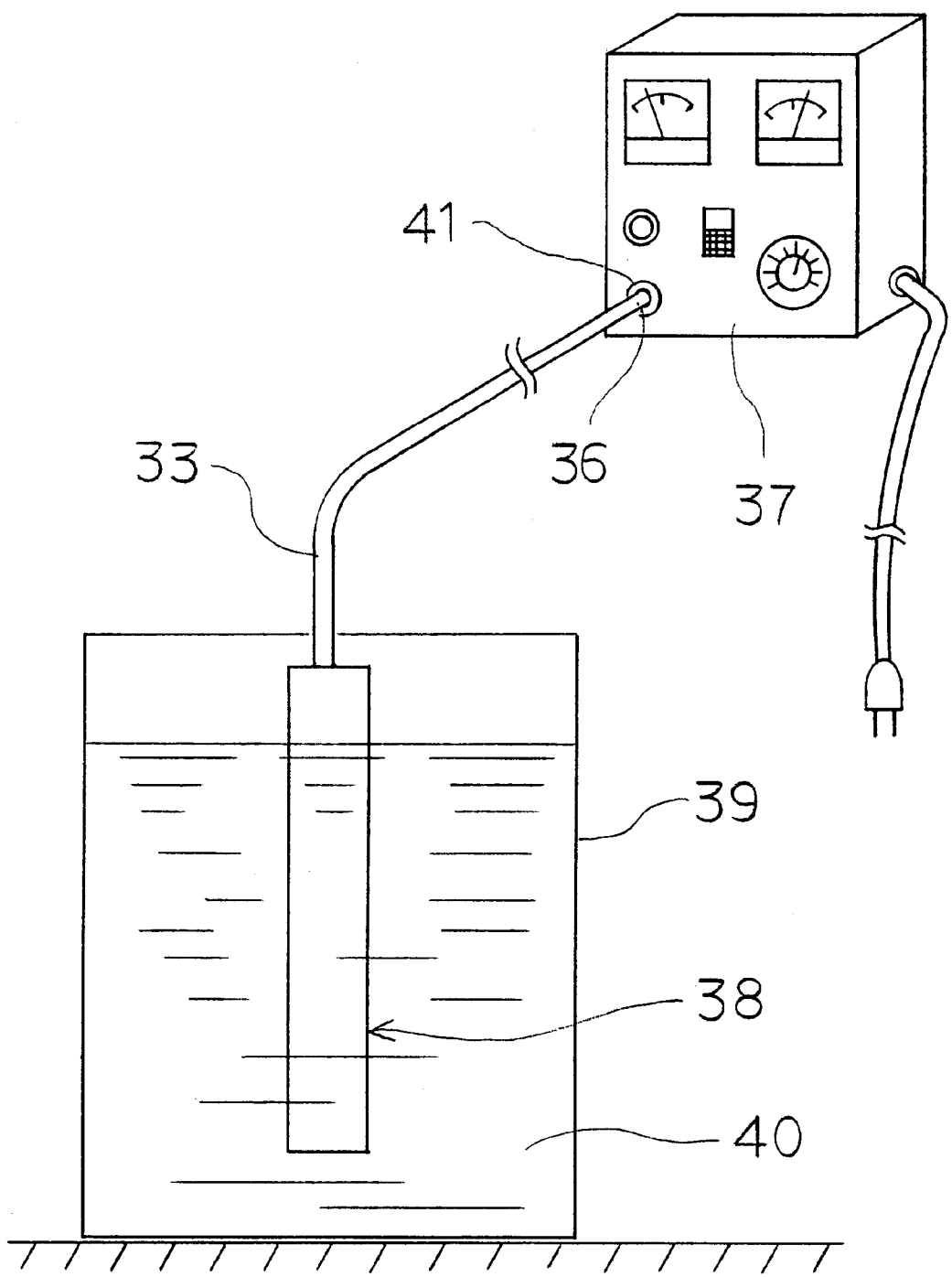
FIG. 6 is an explanatory view illustrating the electrode for an electron-emitting device shown in FIG. 5 in use.

FIG. 6 illustrates a state of manufacturing electron-charged water by use of the electron-emitting electrode 38. The pin jack 36 on a base end portion of the insulator-coated conductor 33 is connected to the output terminal 41 of the electron-emitting device 37. After the electron-emitting electrode is submerged in water 40 in a water tank 39, the insulator-coated conductor 33 is charged with high electrostatic potential from the electron-emitting device 37. Then, a large amount of electrons are radiated from the tourmaline powder 32, which constitutes the electron-emitting electrode 38, into the polyethylene pipe 34. The electrons radiated into the polyethylene pipe 34 are supplied to the water 40 as a wave or undulation so that the water 40 is negatively charged and activated efficiently to produce electron-charged water of high quality.

Since the insulator-coated conductor 33 is not only insulated itself but also completely kept insulated with the polyethylene pipe 34 and the silicone resin 35, the water 40 and the water tank 39 which are objects to be processed require no insulation. Therefore, any construction for electrical insulation is not needed, which makes the device highly practical and of low cost. The electron-emitting electrode can also be applied to a large-scaled apparatus and an underground tank where an insulator cannot be easily provided.

Since the insulator-coated conductor 33 is covered with the conductive stainless steel pipe 31 and the insulating polyethylene pipe 34, when charged with high electrostatic potential, the counteractive anions are interrupted, which enhances the electron emitting function. Thus, the water 40 can be negatively charged and activated efficiently. The strength secured by the stainless steel pipe 31 and the high insulation due to the polyethylene pipe 34 further increase safety. Moreover, if a high-voltage excessive current is generated due to damage caused in the electron-emitting device accidentally, the polyethylene pipe 34 cuts off the excessive current, thereby causing no damage in the electron-emitting electrode 38, the water 40 and the water tank 39.

In the electron-emitting electrode 38, the stainless steel pipe 31 is filled with the tourmaline powder 32. By this construction, when the insulator-coated conductor 33 is charged with high electrostatic potential, electrons are amplified, and the electrons radiated into the stainless steel pipe 31 are efficiently supplied to the water 40, which leads to excellent negative charging and activating effects.

Figure 7:
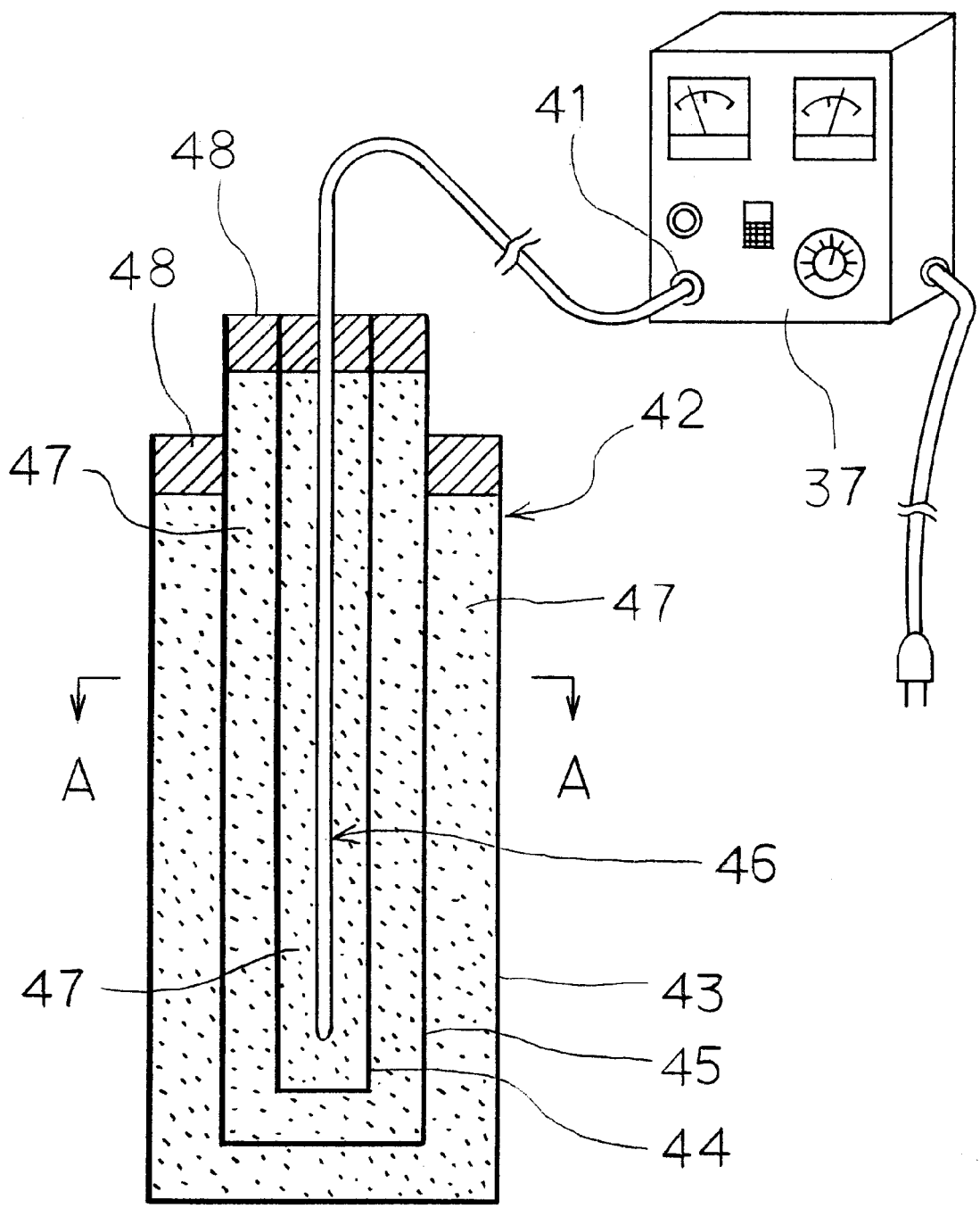
FIG. 7 is a longitudinal sectional view showing another preferred embodiment of an electrode for an electron-emitting device according to the present invention.
Figure 8:
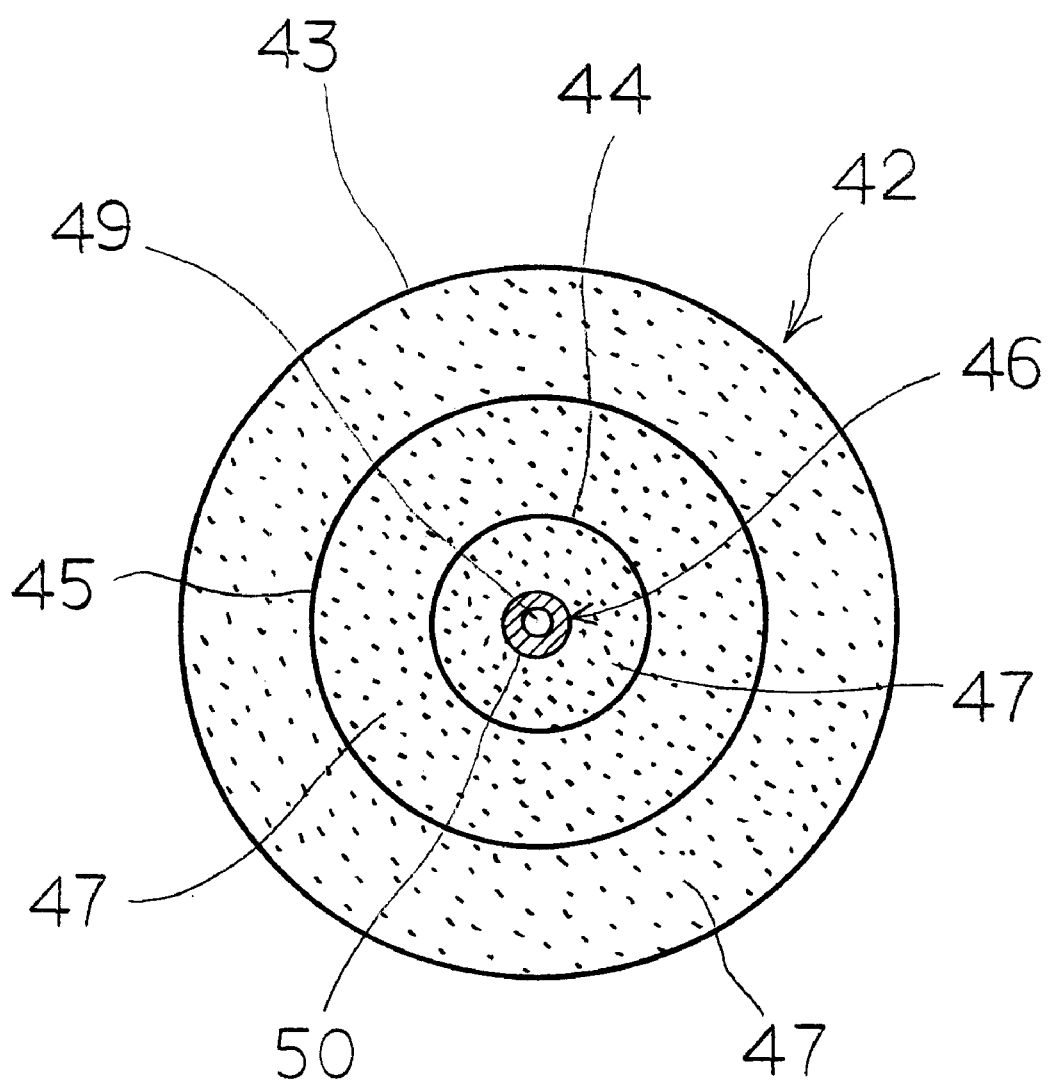
FIG. 8 is a sectional view taken along the line A—A of FIG. 7.

FIGS. 7 and 8 show a longitudinal sectional view and a transverse sectional view of another electrode for an electron-emitting device of the present invention. In an electron-emitting electrode 42, stainless steel pipes 43 and 44 and a polyethylene pipe 45 which have different outer diameters are combined to be nested. Inside the stainless steel pipe 44 which is disposed innermost, an insulator-coated conductor 46 is inserted. Gaps between the stainless steel pipe 44 and the insulator-coated conductor 46 and between the stainless steel pipes 43 and 44 and the polyethylene pipe 45, respectively, are filled with tourmaline powder 47. Openings of the stainless steel pipes 43 and 44 and the polyethylene pipe 45 are sealed with a silicone resin 48.

As shown in FIG. 8, in the insulator-coated conductor 46, an end and outer periphery of a copper wire 49 are wholly covered with insulating material 50 with the base end portion thereof being connected to an output terminal 41 of the electron-emitting device 37, and the insulator-coated conductor 46 is charged with high electrostatic potential which is generated by the electron-emitting device 37.

The electron-emitting electrode 42 is used in the same way as of the electron-emitting electrode 38 shown in FIG. 6 to manufacture electron-charged water and has the same function and effect as the electron-emitting electrode 38 has. In the electron-emitting electrode 42, the stainless steel pipes 43 and 44 and the polyethylene pipe 45 form a triple-layered structure, and each gap between the pipes is filled with the tourmaline powder 47. Accordingly, the electron-emitting electrode exhibits an excellent effect that electrons are generated more efficiently because a potential difference with respect to the load is increased.

Figure 9:
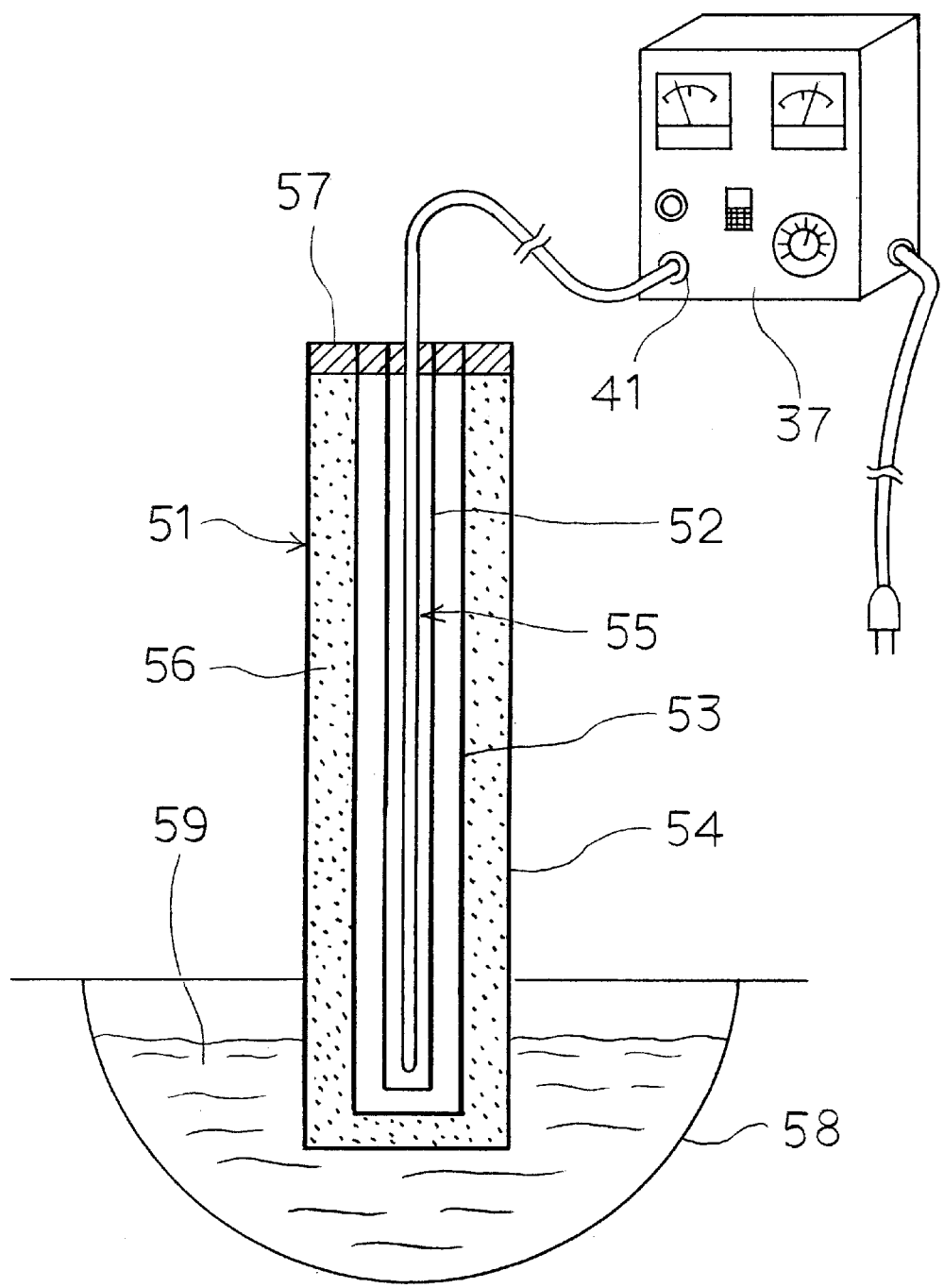
FIG. 9 is a longitudinal sectional view showing further another preferred embodiment of an electrode for an electron-emitting device according to the present invention.

FIG. 9 shows a longitudinal sectional view of another electron-emitting electrode of a preferred embodiment of the present invention. In an electron-emitting electrode 51, ceramic pipes 52, 53 and 54 which have different outer diameters are combined to be nested. Inside the ceramic pipe 52 which is disposed innermost, an insulator-coated conductor 55 is inserted. Gaps between the ceramic pipe 54 disposed outermost and the ceramic pipe 53 in the middle are filled with tourmaline powder 56. Openings of the ceramics pipe 52, 53 and 54 are sealed with a silicone resin 57.

By connecting a base end portion of the insulator-coated conductor 51 in the electron-emitting electrode 51 to the output terminal 41 of the electron-emitting device 37, the insulator-coated conductor 55 can be charged with high electrostatic potential generated by the electron-emitting device 37 and has the same function and effect as the electron-emitting electrode 38 has.

The electron-emitting electrode 51 is excellent in resistance to heat, oil, corrosion and dissolution particularly because all of the bottom-closed cylindrical members which enclose the insulator-coated conductor 55 are ceramic pipes 52, 53 and 53.

Therefore, it is possible to submerge the electron-emitting electrode 51, for example, in a cooking oil 59 heated to a high temperature in a fryer 58 so that the cooking oil 59 can be negatively charged and activated, thereby making crisp and crunchy deep-fried foods. Furthermore, oxidation of the cooking oil 59 is prevented, and excessive oil is easily removed. Since foods can be deep-fried at a lower temperature, energy consumption becomes less.

The electron-emitting electrode 51 may also be used by submerging in a pot when boiling foods. In this case, since water in the pot is negatively charged and activated to change into electron-charged water, the flavor of stock can readily be absorbed into the foods.

Figure 10A:
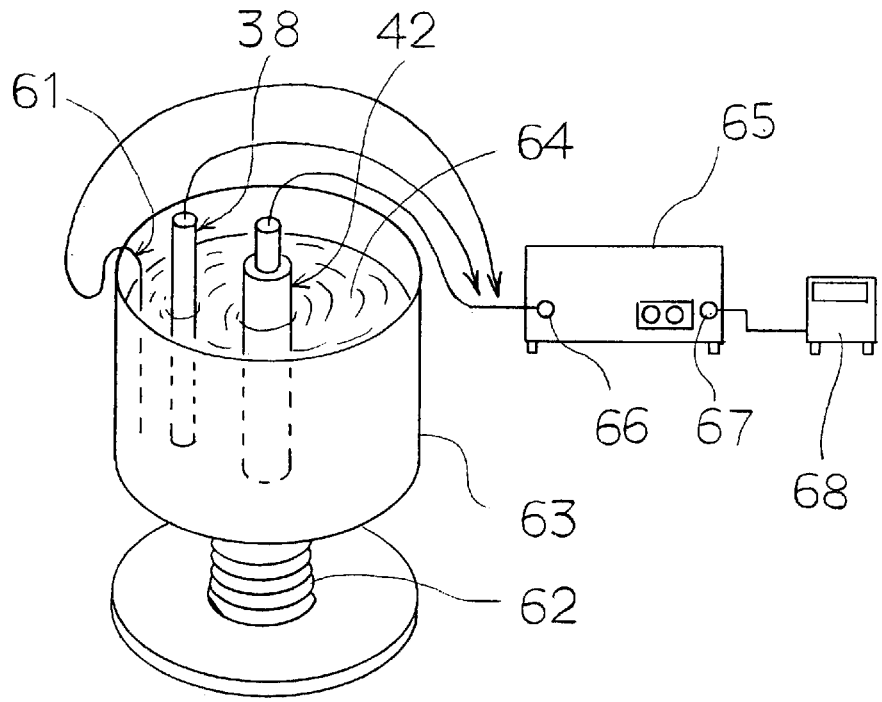
FIG. 10 is an explanatory view showing a comparative experiment on the function of electrodes for an electron-emitting device.
Figure 10B:
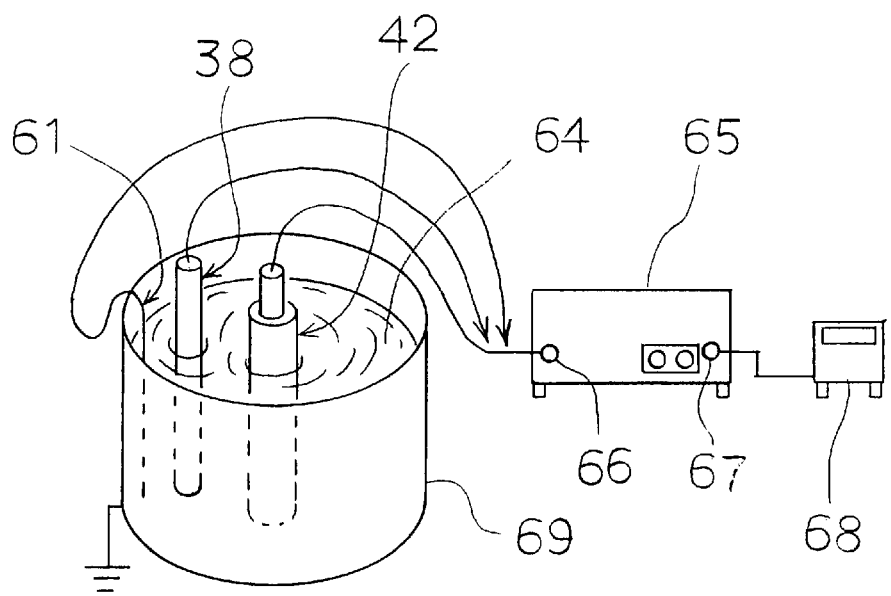

FIG. 10 is an explanatory view showing a comparative experiment on function of electrodes for an electron-emitting device. Electron-charged water is manufactured using an electron-emitting electrode 61 made of non-coated stainless steel wire only, the electron-emitting electrode 38 shown in FIG. 5, and the electron-emitting electrode 42 shown in FIG. 7. The difference in charging function of these electron-emitting electrodes 61, 38 and 42 is explained below.

As shown in FIG. 10(*a*), the electron-emitting electrodes 61, 38 and 42 were submerged in water 64 contained in a stainless steel water tank 63 which was kept insulated by an insulator 62. When each of the electron-emitting electrodes 61, 38 and 42 was charged with electrostatic potential from a secondary coil output terminal 66 of an electron-emitting device 65, voltages on a charging-side terminal 67 of a secondary coil of the electron-emitting device 65 were measured with a voltmeter 68 with regard to each of the electron-emitting electrodes 61, 38 and 42. The results are shown in Table 1.

Here, it has been confirmed that the lower the voltages measured by the voltmeter 68 are, the higher the outputs to the electron-emitting electrodes 61, 38 and 42 and the function of negatively charging the water 64 are.

TABLE 1

| Voltage | Electrode 61 | Electrode 38 | Electrode 42 |
| --- | --- | --- | --- |
| 50 V | 4.319 kV | 3.877 kV | 3.699 kV |
| 100 v | 7.904 kV | 7.222 kV | 6.855 kV |

The above Table 1 shows that, in both cases that the charged potential is 50V and 100V, the voltages on the charging-side terminal 67 of the secondary coil of the electron-emitting device 65 are decreased in the electron-emitting electrodes 61, 38 and 42 in this order. In other words, in the method of manufacturing electron-charged water shown in FIG. 10(*a*), the function negatively charging the water 64 is the lowest in the electron-emitting electrode 61 and the highest in the electron-emitting electrode 42 when the voltages with which the electrodes are charged are the same.

Next, as shown in FIG. 10(*b*), the electron-emitting electrodes 61, 38 and 42 were submerged in the water 64 contained in a stainless steel water tank 69 which was grounded to earth. When each of the electron-emitting electrodes 61, 38 and 42 was charged with electrostatic potential from the secondary coil output terminal 66 of the electron-emitting device 65, voltages on the charging-side terminal 67 of the secondary coil of the electron-emitting device 65 were measured with the voltmeter 68 with regard to each of the electron-emitting electrodes 61, 38 and 42. The results are shown in Table 2.

TABLE 2

| Voltage | Electrode 61 | Electrode 38 | Electrode 42 |
|---------|--------------|--------------|--------------|
| 50 V    | 7.868 kV     | 5.924 kV     | 4.542 kV     |
| 100 v   | 10 kV or more| 10 kV or more| 7.743 kV     |

The above Table 2 shows that, in both cases that the charged potential is 50V and 100V, the voltages on the charging-side terminal 67 of the secondary coil of the electron-emitting device 65 are decreased in the electron-emitting electrodes 61, 38 and 42 in this order. In other words, in the method of manufacturing electron-charged water shown in FIG. 10(b), the function negatively charging the water 64 is the lowest in the electron-emitting electrode 61 and the highest in the electron-emitting electrode 42 when the voltages with which the electrodes are charged are the same.

To sum up the above results, it has been proven that the function of negatively charging the water 64 is higher in the methods using the stainless steel water tank 69 grounded to earth and the electron-emitting electrodes 38 and 42, compared with the conventional method using the stainless steel water tank 63 kept insulated with the insulator 62 and the electron-emitting electrode 61 made of non-coated stainless steel wire only.

An electron-emitting device and an electrode for an electron-emitting device according to the present invention can be utilized for manufacturing electron-charged water which is used as drinking water, processed water, cooking water, bath water or the like for businesses such as processed food manufacturers, supermarkets and hotels and for households. The present invention can also be used for the purposes of counteracting and removing chemical substances contained in food, materials for processed food, livestock feed or the like as well as for adding anions to air.

What is claimed is:

1. An electrode for an electron-emitting device comprising a plurality of bottom-closed cylindrical members in which at least one of said bottom-closed cylindrical members is made of insulating material, said bottom-closed cylindrical members being combined to be nested, an insulator-coated conductor having one end inserted into an innermost member of said bottom-closed cylindrical members, tourmaline powder filling a gap between said innermost bottom-closed cylindrical member and said insulator-coated conductor and/or a gap between said plurality of the bottom-closed cylindrical members, and an insulating seal member which seals openings of said plurality of bottom-closed cylindrical members.

2. The electrode for an electron-emitting device according to claim 1, wherein at least one of said plurality of bottom-closed cylindrical members is a conductive cylindrical member.

3. The electrode for an electron-emitting device according to claim 1 or 2, wherein said tourmaline powder is fluid powder having a diameter of 1 $\mu$m to 5 mm.

4. An electrode for an electron-emitting device comprising:

at least first and second closed bottom tubular members, said first closed bottom tubular member being nested within said second closed bottom tubular member, one of said first and second closed bottom tubular members being an electrical insulator and another one of said first and second closed bottom tubular members being an electrical conductor;

an insulator-coated conductor disposed within said first closed bottom tubular member and extending therefrom for connection to said electron-emitting device;

tourmaline powder filling a gap between said first closed bottom tubular member and said insulator-coated conductor; and an insulating seal member which seals an opening of said first closed bottom tubular member, said insulator-coated conductor extending through said seal member.

5. The electrode of claim 4 further comprising tourmaline powder filling a gap between said first closed bottom tubular member and said second closed bottom tubular member.

6. The electrode of claim 5 further comprising a third closed bottom tubular member having said first and second closed bottom tubular members nested therein and tourmaline powder filling a gap between said third closed bottom tubular member and said second closed bottom tubular member.

7. The electrode of claim 6 wherein said third closed bottom tubular member is electrically conductive.

8. The electrode of claim 7 wherein said second closed bottom tubular member is the electrical insulator.

* * * * *